March 1, 1966 A. C. MAMO 3,237,737
FRICTION ENGAGING MECHANISM
Filed June 29, 1962 3 Sheets-Sheet 1

Inventor:
Anthony C. Mamo
By: John W. Butcher
Atty

March 1, 1966      A. C. MAMO      3,237,737
FRICTION ENGAGING MECHANISM
Filed June 29, 1962      3 Sheets-Sheet 2
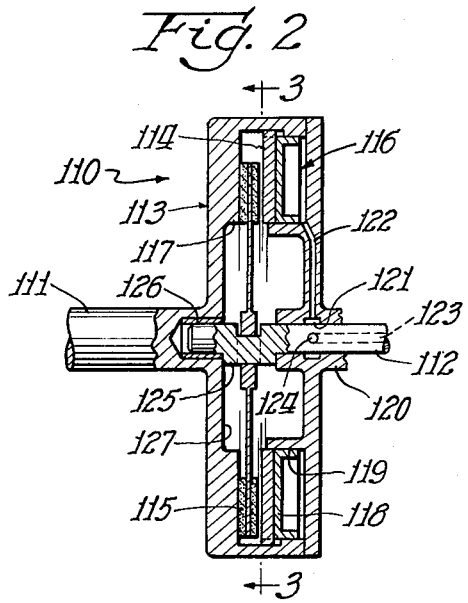
Fig. 2
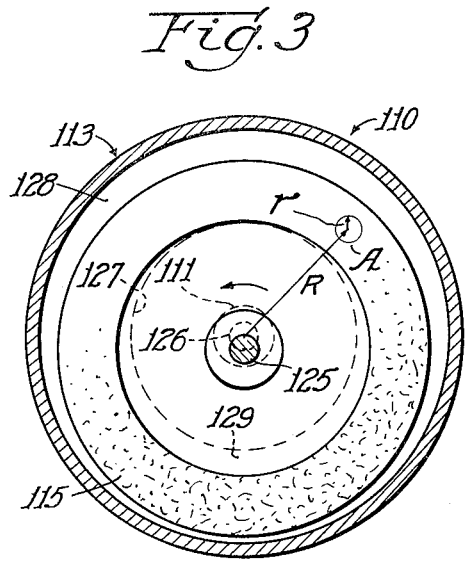
Fig. 3
Fig. 4
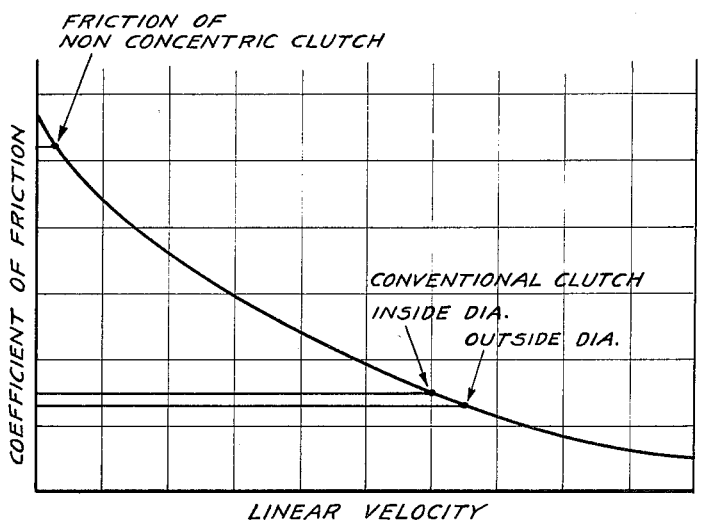
Inventor:
Anthony C. Mamo
By: John W. Butcher, Atty.

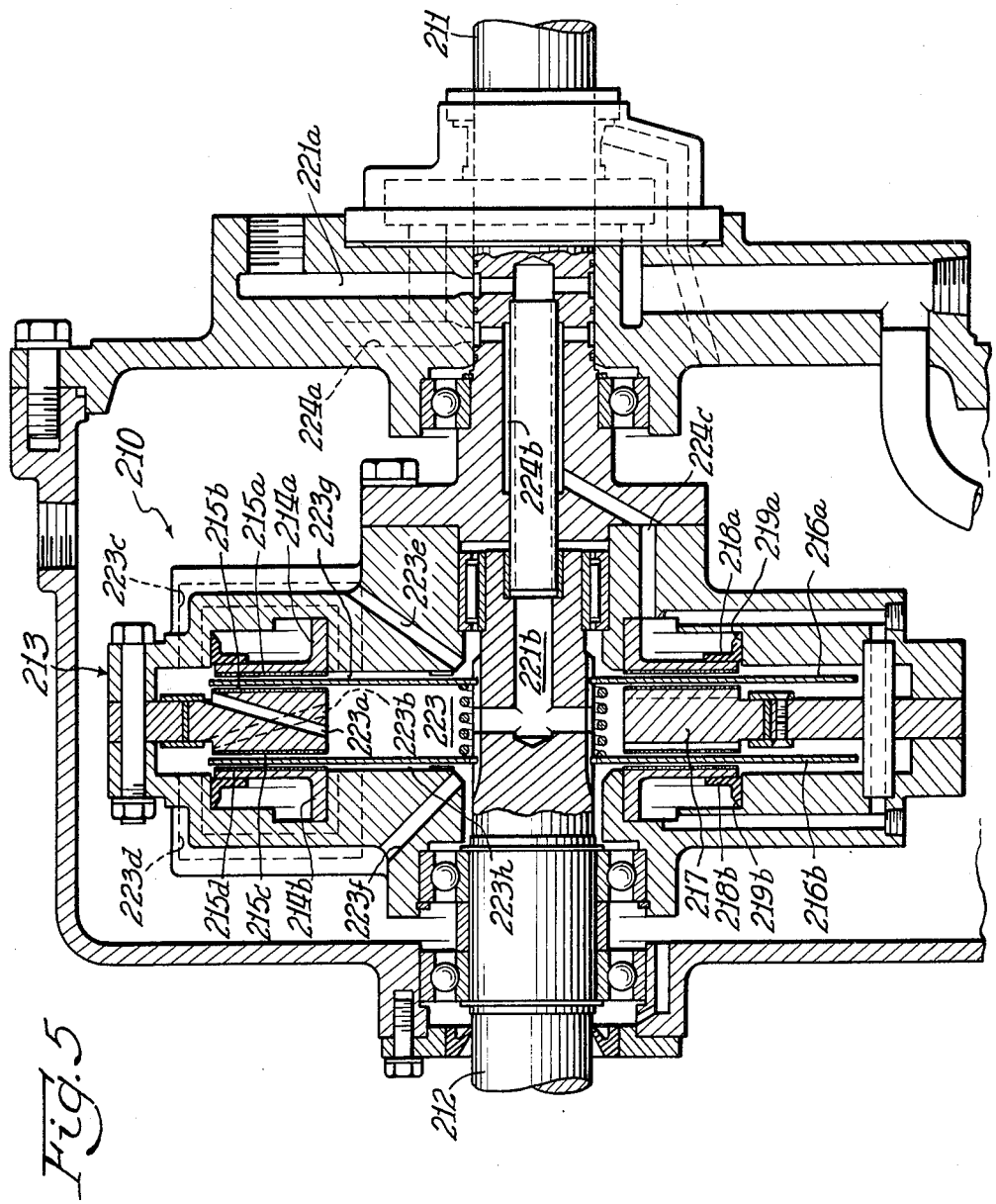

United States Patent Office 3,237,737
Patented Mar. 1, 1966

3,237,737
FRICTION ENGAGING MECHANISM
Anthony C. Mamo, Des Plaines, Ill., assignor to Borg-Warner Corporation, Chicago, Ill., a corporation of Illinois
Filed June 29, 1962, Ser. No. 206,444
5 Claims. (Cl. 192—69)

This invention relates to a friction engaging mechanism such as a brake or clutch.

Brakes and clutches of the disc type having relatively rotatable and engageable friction discs and plates are well known in the art. In such a mechanism, the plates are normally splined or fixed in some manner to an input shaft and the friction discs are splined or fixed in some manner to an output shaft or vice versa. The plates and discs are normally pressed into engagement by suitable pressure creating means such as a fluid servomotor or spring mechanism.

It is well known that in the process of engaging such a mechanism, a considerable amount of energy in the form of heat, is generated between the engageable parts thereof. For severe applications, and/or prolonged slipping applications the heat so generated can cause glazing of the friction surface with a reduction in the coefficient of friction between the discs and plates.

It is also well known that in an operating mechanism of this type, there commonly exists a comparatively high relative velocity between each disc and plate prior to engagement. The relative velocity of any point on a disc or plate is equal to the product of the relative angular velocity times the radius of the point from the center of rotation. The relative rubbing velocity between a plate and disc upon engagement of the mechanism is thus greater at the outer periphery thereof than at the inner periphery. This difference in rubbing velocity generally results in generating a larger quantity of heat in the outer portion of the plate and disc than in the inner portion, or vice versa depending on the specific coefficient of friction slope. This, in turn, results in overloading one area of the clutch and underloading another, and can tend to produce undesirable heat distortion, or bellmouthing, of the friction disc and/or friction plate. This variation in rubbing velocity also limits the practicable diameter of such a mechanism as well as limits the usable width of friction area between the inner and outer peripheries. In other words as the width of the friction material is increased the respective peripheral speed results in an increased differential in coefficient of friction thus aggravating the thermal distortion problem.

It is an object of the present invention to provide an improved friction engaging mechanism particularly adapted for high speed engagement and having provision for dissipating engagement energy across the friction disc equally to minimize heat distortion thereof.

It is an additional object of the present invention to provide engageable surfaces of the relatively rotatable members wherein the respective surfaces are exposed to the cooling media such that the heat transfer from these surfaces is substantially improved over heretofore known devices.

It is a still further object to provide an embodiment wherein a novel flow of lubrication media is provided across the surfaces of the relatively rotatable members.

It is another object to provide an improved friction engaging mechanism which permits a relatively long engaging time for any given friction material without overheating of the friction material.

It is still another object to provide an improved friction engaging mechanism having a substantially increased coefficient of friction over conventional mechanisms for any given relative r.p.m. of the engageable parts of the mechanism.

It is an additional object of the present invention to provide an improved friction engaging mechanism in which the rubbing velocity between the engageable parts of the mechanism is reduced a substantial amount in comparison to the rubbing velocity between the engageable parts of the mechanism in a conventional clutch.

It is another object to provide an improved friction engaging mechanism utilizing a driving member rotatable about a first axis, a driven member rotatable about a second axis, and an engaging member rotatable about a third axis wherein said third axis is nonconcentric with at least one of said first and said second axis.

The invention consists of the novel constructions, arrangements, and devices to be hereinafter described and claimed for carrying out the above stated objects and such other objects as will appear from the following description of preferred forms of the invention illustrated with reference to the accompanying drawings wherein:

FIGURE 2 is a view, partially in cross section of an alternate embodiment of the present invention;

FIGURE 3 is a view, partially in cross section taken along section lines 3—3 of FIGURE 2;

FIGURE 4 is a view illustrating comparative data of a conventional friction engaging mechanism and the friction engaging mechanism of the present invention; and FIGURE 5 is a view, partially in cross section of the preferred embodiment of the present invention.

Figure 1:
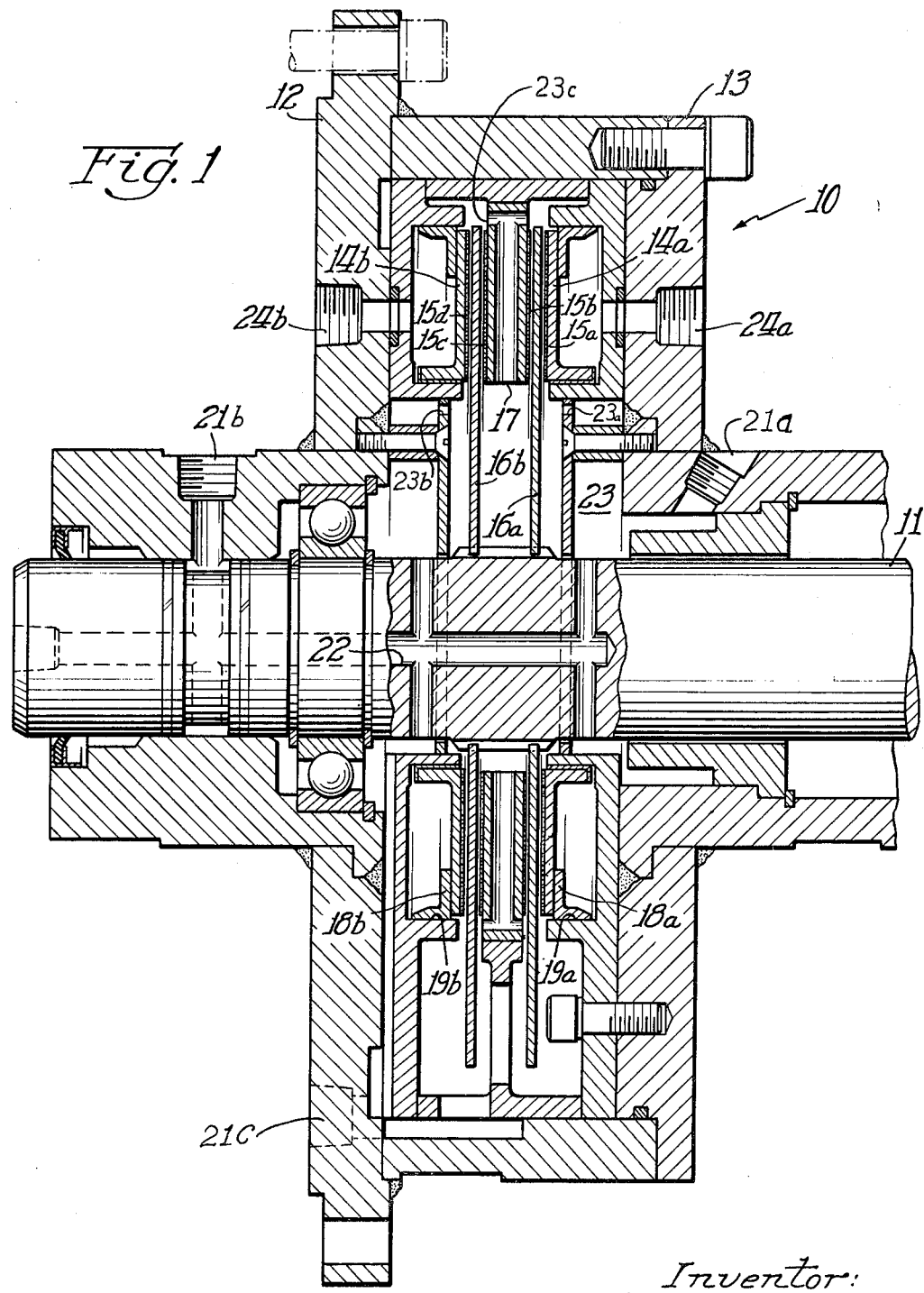
FIGURE 1 is a view, partially in cross section of an embodiment of the present invention.

Referring now to FIG. 1, there is illustrated an improved friction engaging mechanism designated generally by the numeral 10. The friction engaging mechanism 10, in general, comprises an input shaft 11, a torque receiving member 12, an annular housing 13 fixably attached to the torque receiving member 12, axially movable pressure plates 14a and 14b positioned within the housing 13, and friction material 15a, 15b, 15c, and 15d mounted on opposite sides of the discs 16a and 16b. The discs 16a and 16b are sandwiched between the movable pressure plates 14a and 14b and a portion of the housing 13 which supports the intermediate pressure plate 17.

Annular pistons 18a and 18b are provided on the outer sides of pistons 14a and 14b respectively. These pistons are slidably positioned within annular cavities 19a and 19b and are arranged to help actuate the movable pressure plates 14a and 14b. The annular pistons 18a and 18b as well as the pressure plates 14a and 14b are actuated by fluid under pressure being applied by way of ports 24a and 24b.

A cooling means includes ports 21a, 21b and 21c, interior portion 23 of housing 13, circulation ports 23a, 23b and 23c, and channel 22 formed within input member 11. Fluid, under pressure, may be circulated through the above mentioned cooling means to dissipate heat generated by application of the facing material to the discs.

The friction developing material 15a, 15b, 15c and 15d is rotatably mounted with respect to the housing 13 and with respect to the input member 11. The friction facing material is preferably of an annular configuration and more particularly of a circular configuration such that it is free to rotate with respect to the member in which it is mounted.

The embodiment illustrated in FIG. 1 is particularly suitable for use as a brake. With this embodiment utilized as a brake the output member 12 would be fixably attached to the ground and would operate as follows:

Assuming the mechanism 10 to be disengaged initially and the input member 11 to bear a relative speed with respect to the ground or torque receiving member 12, the mechanism is engaged when fluid under pressure is supplied to the annular pistons 18a and 18b. The annular pistons are forced to move toward the discs 16a and 16b and as the pistons move toward the discs they urge the pressure plates 14a and 14b against the friction discs 16a and 16b. The friction discs 16a and 16b, in turn, are pressed against the pressure plate 17. The pressure plate is rotatably mounted with respect to its supporting member, i.e., the annular housing 13; however, in the preferred embodiment the pressure plate 17 is prevented from shifting in an axial direction (see plates 213a FIGURE 5). The frictional force established between the discs 16a and 16b and the friction material 15a, 15b, 15c, and 15d tends to retard the speed of the discs 16a and 16b. The friction material 15a, 15b, 15c, and 15d tends to rotate along with the discs 16a and 16b, thus greatly reducing the sliding velocity of the friction faces while creating relative rotational speed between the friction material and its supporting structure, i.e., the annular housing 13. The friction facing material is caused to orbit about the axis of the input member 11. The orbital velocity of the facing material tends to maintain a one to one relationship with the input member 11.

Referring now to FIG. 5 the preferred embodiment of the present invention is particularly suitable for use as a clutch or constant slip mechanism. The clutch is generally designated by the numeral 210 and in general comprises an input member 211, an output member 212, an annular housing 213 rotatably journaled on the output member 212 and driven by the input member 211, axially movable pressure plates 214a and 214b positioned within the housing 213, and friction material 215a, 215b, 215c and 215d mounted on opposite sides of the discs 216a and 216d. The discs 216a and 216b are sandwiched between the movable pressure plates 214a and 214b and a portion of the housing 213 which supports the intermediate pressure plate 217.

Annular pistons 218a and 218b are provided on the outer sides of discs 214a and 214b respectively. These pistons are slidably positioned within annular cavities 219a and 219b and are arranged to help actuate the movable pressure plates 214a and 214b. The annular pistons 218a and 218b as well as the pressure plates 214a and 214b are actuated by fluid, under pressure, being applied in a manner described hereinbelow.

A cooling means includes port 221a, passage 221b, interior portion 223 of housing 213, circulation ports 223a, 223b, 223c, 223d, 223e, and 223f. Fluid, under pressure may be circulated by way of port 221a through the passage 221b into the interior portion 223 of the housing 213, then through passages 223a and 223b in the fixed pressure plate 217 and then through the housing passages 223c and 223d back into passageways 223g and and 223h between the outside of the discs 216a and 216b and the housing 213, and then through the passageways 223e and 223f, thus providing improved means of dissipating heat from the engaging elements of the clutch mechanism. Alternatively, the direction of flow of circulating fluid can be reversed from that described when desired.

Friction developing material 215a, 215b, 215c and 215d is rotatably mounted with respect to the housing 213 and with respect to the input member 211. Friction material is preferably of an annular configuration and more particularly of a circular configuration with or without grooving and such that it is free to rotate with respect to the member in which it is mounted.

The operation of the preferred embodiment is as follows:

Assuming the mechanism to be disengaged initially and the input member 211 to bear a relative rotatable speed with respect to the output member 212, the mechanism is engaged when fluid, under pressure, is supplied to the annular pistons 218a and 218b by way of passage 224a, annular passage 224b and housing passage 224c. The annular pistons are forced to move toward discs 216a and 216b and as the pistons move toward the discs they urge the pressure plates 214a and 214b towards discs 216a and 216b. Friction discs 216a and 216b, in turn, are pressed towards the pressure plate 217. The pressure plate is rotatably mounted with respect to its supporting member, i.e., annular housing 213; however, in the preferred embodiment the pressure plate 217 is prevented from shifting axially (see plates 213a). The initial engagement of the friction facing material with the discs 216a and 216b tends to retard the rotational speed of the pressure plates 214a and 214b and intermediate pressure plate 127. This causes relative movement between the movable pressure plates 214a and 214b and the intermediate pressure plate 217 with respect to the housing 213 but greatly reduces the sliding velocity of the friction faces; and as a result of this relative rotational speed, the friction material is caused to orbit about the axis of the output member 212 thus defining an orbital path on the discs 216a and 216b. The orbital velocity of the facing material with respect to the discs 216a and 216b decreases as the force exerted by the annular pistons 218a and 218b against the discs 216a and 216b increases until such time as the orbital velocity decreases to zero at which time the input member is locked up with respect to the output member.

Referring now to FIG. 2, there is illustrated an improved friction engaging mechanism designated generally by the numeral 110. The friction engaging mechanism 110, in general, comprises an input shaft 111, an output shaft 112, an annular housing 113 fixedly attached to the input shaft 111, an axially movable pressure plate 114 splined within the housing 113, a friction disc 115 rotatably mounted on the output shaft 112, and a hydraulic servomotor 116. The friction disc 115 is sandwiched between the movable pressure plate 114 and a portion of the housing 113 comprising a fixed end pressure plate 117.

The servomotor 116 comprises an annular piston 118 slidably disposed within an annular cavity 119 formed in the housing 113. The piston 118 abuts directly against the movable plate 114. A hub portion 120 of the housing 113 is journaled on the output shaft 112. The hub portion 120 is formed with an annular groove 121 and the housing 113 is formed with a channel 122 in communication with the groove 121 and with the annular cavity 119. The output shaft 112 is formed with a longitudinal passage 123 and a radial port 124 in communication with the passage 123 and with the annular groove 121. Fluid is supplied to the servomotor 116 for engaging the mechanism 110 through the passage 123, the port 124, the groove 121, and the channel 122 from any suitable source of fluid pressure (not shown).

The friction disc 115 is rotatably mounted on an eccentric crank portion 125 of the output shaft 112, and one end of the output shaft 112 is piloted within the input shaft 111 at 126. It is contemplated that the interior 127 of the housing 113 may be filled with a liquid medium, such as oil, which can be circulated therethrough for absorbing heat from the engageable parts 114, 115, and 117 as will be described hereinafter.

Referring now to FIG. 3, there is illustrated a portion of the fixed pressure plate 117, and the friction disc 115 which are radially displaced from each other by virtue of the eccentric crank portion 125 of the output shaft 112. A crescent shaped portion 128 of the plate 117 is exposed above the friction disc 115, and another crescent shaped portion 129 of the plate 117 is exposed within the friction disc 115. The crescent shaped areas 128 and 129 are exposed to the fluid contained within the housing 113 and it is contemplated that even during engagement heat can be transferred from the exposed areas 128 and 129 to the fluid by conduction.

In operation, the friction engaging mechanism 110 functions as follows:

The mechanism 110 is assumed to be disengaged initially and the output shaft 112 to bear a relative speed with respect to the input shaft 111. The input shaft 111 is assumed to be rotating in a counterclockwise direction as shown in FIG. 3.

The mechanism 110 is engaged when fluid pressure is supplied to the servomotor 116 and the piston 118 forces the plate 114 against the friction disc 115. The friction disc 115, in turn, is pressed against the pressure plate 117. The frictional force established between the pressure plate 117 and the friction disc 115 tends to cause the friction disc 115 to rotate in the counterclockwise direction with the plates 117 and 114. The friction disc 115 tends to maintain a one to one relationship with the input member 111. The friction disc 115 is constrained to oscillate in a generally circular motion about the eccentric crank portion 125. Each point on the friction disc 115 in contact with the pressure plate 117 describes a circular motion of radius $r$ approximately equal to the radius of eccentricity of the crank portion 125, thus greatly reducing the sliding velocity of the friction faces.

To more completely understand the type of motion involved, consider a point A on the friction disc 115 in contact with the pressure plate 117. In a conventional type of clutch, the rubbing velocity existing between the pressure plate 117 and the friction disc 115 at the point A would be equal to the product of the relative angular velocity of the plate 117 times the radius R (as shown on FIG. 3). In the present invention, however, the friction disc 115 is urged to rotate about, but is constrained by, the eccentric crank portion 125 of the output shaft 112 and hence the point A moves in a smaller circle of radius $r$. The rubbing velocity between the plate 117 and the friction disc 115 thus is equal to the product of the relative angular velocity times the radius $r$, where $r$ is approximately equal to the radius of eccentricity of the crank portion 125 of the output shaft 12. The rubbing velocity of the disc 115 with respect to the plate 117 is thus reduced by a factor equal to about the ratio of: $r/R$.

It is to be noted that while the friction disc 115 is executing this orbital motion with respect to the axis of the input member, the friction disc 115 effectively slides across the plate 117. The exposed areas 128 and 129 thus effectively also rotate to change their position as the friction disc 115 executes this motion. For example, one-half revolution later, the friction disc 115 will have moved to a new position. Different portions of the pressure plate 117 are thus exposed to the cooling fluid circulated within the housing 113 during each revolution of the plate 117. If it is desired that the interior 127 of the housing 113 not be filled with a liquid, a portion of the plate 117 will still be exposed to air during each revolution so that improved cooling thereof can be realized. In the present invention, the friction facing material is free to orbit about the axis of the input member 111 and hence a point on the inner periphery and a point on the outer periphery orbit the axis of the housing and their respective orbital paths are nearly equal in length. The respective rubbing velocity of the inner and outer periphery of the facing material and the discs is substantially equal and is substantially less than the rubbing velocity associated with a conventional clutch. The rubbing velocity is a function of the dimension of nonconcentricity between the axis of the facing material and the axis of the input shaft.

The present invention, in general, utilizes a driving member adapted to rotate about a first axis, a driven member adapted to rotate about a second axis and an intermediate engaging member adapted to rotate about a third axis. The intermediate engaging member is freely rotatable with respect to both the driving member and the driven member and may be supported by either the driving member or the driven member. An important feature of the present invention is the displacement of the third axis from at least one of the other axes that the third axis is nonconcentric with respect to at least one of the other axes and such that it is parallel thereto. This non-concentric relationship in combination with the circular configuration of the freely rotatable engaging member results in the orbital path of the engaging member. All points on the inner periphery of the annular member (from initial engagement until lock up) slide on the member it engages. Considering a wet clutch or brake wherein a liquid cooling media is present within the housing the inner periphery during one-half rotation is advancing (sliding) on a wet surface and during the remaining half rotation is retreating thus exposing the liquid media to a predetermined area on the face engaged by the intermediate engaging member. The amount of sliding of the intermediate engaging member on the face it engages is proportional to the dimension of nonconcentricity between the respective members. It is important the inner periphery advance and retreat an amount at least equal to one-half the width of the facing material. This important feature provides for contact of cooling media over the entire engaging surface for each orbit of the intermediate engaging member. The minimal amount of nonconcentricity required to accomplish this desired result is generally about one-half the dimension of the width of the smallest facing material. Although the above dimension of nonconcentricity results in an improved heat dissipation operation, a more preferred dimension of at least an amount equal to the width of the facing material results in complete exposure of the engaging surface twice per revolution. With this preferred arrangement each point on the engaging surface is exposed to the cooling media nearly the same increment of time wherein the aforementioned dimension results in an exposure at the mid point of the engaging surface equal to one half the exposure at the peripheral portions.

Referring now to FIG. 4, there is illustrated a graph of the relationship of coefficient of friction versus rubbing or sliding velocity for two bodies in frictional contact. This figure illustrates the comparative coefficient of friction of a point located on the outer diameter of a facing material and a point located on the inner diameter of a facing material of a conventional clutch with the driven member rotating a predetermined speed. It will be noted the point on the outer portion is traveling at a higher speed than the point on the inner portion with the result that the coefficient of friction is less on the exterior of the band than on the interior, thus resulting in a gradient of coefficients across the width of the facing material. This figure also illustrates the comparative coefficient of friction of substantially all points located on the facing material of the present invention with the above mentioned points of a conventional clutch with the respective driven members rotating at the same predetermined speed.

The numerous advantages of the present invention can be summarized as follows:

The increase in engagement time which results from this improved type of friction engaging mechanism opens up fields of application heretofore unattainable by the conventional type of clutch or brake. For example, this improved type of clutch can be used in high speed applications such as for coupling a gas turbine where the relative angular velocity may approach 15,000 to 20,000 r.p.m. as compared to approximately 5,000 r.p.m. in a conventional automotive vehicle engine.

The present invention also would be particularly useful where a prolonged and/or continuous slipping time is demanded by the nature of the apparatus; for example, as in setting a helicopter rotor in rotation from a high speed power source or in starting a conveyer belt, or driving a plurality of stations from a single power source, or in applications wherein it has heretofore been customary to employ scoop-tube or fill spill type fluid couplings.

The present invention also is useful in conventional applications such as in automotive clutches or brakes where this improved mechanism can operate with increased efficiency and with prolonged life over that of the conventional clutch or brake.

The improved friction engaging mechanism of the present invention also has some additional advantages because of the unique motion described by the friction disc with respect to the pressure plate. For example, the wear distribution pattern is spread evenly over the entire area of the friction disc and plate. Also, within a given diameter, a friction disc of much larger area than that of the conventional type clutch can be utilized because of the fact that the rubbing velocity near the outer periphery of the friction disc and plate is substantially equal to the rubbing velocity near the inner periphery of the friction disc and plate. The resulting uniform heat gradient has all but eliminated the conventional bell-mouthing tendency of a clutch pack and therefore permits a much wider friction facing width to be used.

It is to be understood that the present invention is not to be limited to the specific constructions and arrangements shown and described, except only insofar as the claims may be so limited, as it will be understood by those skilled in the art that changes may be made without departing from the principles of the invention.

I claim:

1. In a friction engaging mechanism, the combination comprising: an input member and an output member disposed to rotate about an axis, said input member having a circular-shaped annular recess therein circumscribing said axis, and a circular-shaped annular engaging member located within said annular recess and rotatably supported with respect to said input member and said output member and having a center displaced from said aforementioned axis, said circular-shaped annular engaging member including a radially disposed surface of friction facing material for engagement with said output member.

2. A friction engaging apparatus including: an output member; a plurality of radially extending discs carried by said output member; a housing surrounding said discs; an input member connected to said housing; a circular-shaped engaging member rotatably supported within said housing, said circular-shaped engaging member being rotatable relative to said housing and being rotatable relative to said input member, said input member and said output member being disposed to rotate about an axis, said circular-shaped engaging member having a center displaced from said axis, said circular-shaped engaging member being disposed on opposite sides of said discs, said circular-shaped engaging member circumscribing said axis; means for effecting engagement of said discs with said circular shaped annular engagement member.

3. A friction engaging device including an output member rotatable about an axis; a plurality of radially extending discs carried by said output member; a housing surrounding said discs; an input member connected to said housing and being rotatable about said axis; a circular-shaped annular engaging member rotatably supported within said housing and freely rotatable relative to the said housing; said circular-shaped annular engaging member having a center located in a position which does not coincide with said axis; said circular-shaped annular engaging member circumscribing said output member and being disposed on opposite sides of said discs; and actuator means for effecting engagement of said discs with said circular-shaped annular engaging member.

4. In a friction engaging mechanism, the combination comprising an output member disposed to rotate about an axis, an input member including a radially disposed face having a circular-shaped annular recess therein, said circular-shaped annular recess circumscribing said axis, said input member being disposed to rotate about said axis, and a circular-shaped annular engaging member circumscribing said axis being located within and rotatably supported with respect to said circular-shaped annular recess, said circular-shaped annular engaging member including a radially disposed surface for engagement with said output member, said circular-shaped annular engaging member having a center located in a position which does not coincide with said axis.

5. An apparatus in accordance with claim 4 wherein said output member includes a plurality of radially disposed discs having surfaces for engagement with said circular-shaped annular engaging member.

References Cited by the Examiner

UNITED STATES PATENTS

| 2,039,590 | 5/1936 | Freeborn | 192—69 |
|---|---|---|---|
| 2,419,890 | 4/1947 | Freeborn | 192—105 |
| 2,517,973 | 8/1950 | Cardwell et al. | 188—264.2 |
| 2,914,157 | 11/1959 | Lacroix. | |

FOREIGN PATENTS

| 339,581 | 4/1930 | Great Britain. |
|---|---|---|
| 417,082 | 1/1944 | Italy. |

DON A. WAITE, *Primary Examiner.*

ROBERT C. RIORDON, DAVID J. WILLIAMOWSKY,
*Examiners.*